(12) United States Patent
Mocenigo et al.

(10) Patent No.: US 8,571,857 B2
(45) Date of Patent: Oct. 29, 2013

(54) SYSTEM AND METHOD FOR GENERATING MODELS FOR USE IN AUTOMATIC SPEECH RECOGNITION

(75) Inventors: John Mocenigo, Califon, NJ (US);
Mazin Gilbert, Warren, NJ (US);
Heather Wighton, Flemington, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 283 days.

(21) Appl. No.: 12/908,222

(22) Filed: Oct. 20, 2010

(65) Prior Publication Data

US 2012/0101817 A1    Apr. 26, 2012

(51) Int. Cl.
*G10L 15/00*    (2013.01)

(52) U.S. Cl.
USPC ............ 704/231; 704/270; 704/275; 704/251

(58) Field of Classification Search
USPC ......................................................... 704/231
See application file for complete search history.

(56) References Cited

U.S. PATENT DOCUMENTS

| | | | |
|---|---|---|---|
| 6,014,624 A * | 1/2000 | Raman | 704/243 |
| 6,490,558 B1 * | 12/2002 | Kahn et al. | 704/235 |
| 6,629,075 B1 * | 9/2003 | Schalkwyk | 704/270 |
| 7,016,835 B2 * | 3/2006 | Eide et al. | 704/231 |
| 7,289,958 B2 * | 10/2007 | Bernard et al. | 704/255 |
| 7,797,158 B2 * | 9/2010 | Gilbert | 704/234 |
| 7,809,549 B1 * | 10/2010 | Bangalore et al. | 704/2 |
| 8,275,615 B2 * | 9/2012 | Kozat et al. | 704/240 |
| 2005/0257178 A1 * | 11/2005 | Daems et al. | 716/2 |
| 2007/0233481 A1 * | 10/2007 | Yao | 704/245 |
| 2008/0059173 A1 * | 3/2008 | Gilbert et al. | 704/235 |
| 2008/0270135 A1 * | 10/2008 | Goel et al. | 704/257 |
| 2010/0076752 A1 * | 3/2010 | Zweig et al. | 704/10 |
| 2011/0112832 A1 * | 5/2011 | Prorock et al. | 704/235 |
| 2011/0137648 A1 * | 6/2011 | Ljolje et al. | 704/231 |
| 2012/0101817 A1 * | 4/2012 | Mocenigo et al. | 704/231 |
| 2012/0150536 A1 * | 6/2012 | Dognin et al. | 704/231 |
| 2012/0179451 A1 * | 7/2012 | Miyamoto et al. | 704/2 |

* cited by examiner

*Primary Examiner* — David R Hudspeth
*Assistant Examiner* — Timothy Nguyen (57) ABSTRACT

Disclosed herein are systems, methods, and non-transitory computer-readable storage media for generating a model for use with automatic speech recognition. These principles can be implemented as part of a streamlined tool for automatic training and tuning of speech, or other, models with a fast turnaround and with limited human involvement. A system configured to practice the method receives, as part of a request to generate a model, input data and a seed model. The system receives a cost function indicating accuracy and at least one of speed and memory usage, The system processes the input data based on seed model and based on parameters that optimize the cost function to yield an updated model, and outputs the updated model.

20 Claims, 7 Drawing Sheets

SYSTEM AND METHOD FOR GENERATING MODELS FOR USE IN AUTOMATIC SPEECH RECOGNITION

BACKGROUND

1. Technical Field

The present disclosure relates to generating speech, acoustic and/or language models and more specifically to streamlining model development for fast turnaround and minimal human involvement.

2. Introduction

In the automatic speech recognition (ASR) industry, the process of generating and tuning speech models, acoustic models, and/or language models is very labor intensive and time consuming. The process requires the efforts of many individuals to perform the various steps and iterations. Not only must humans perform large portions of the work, the process requires human decision making at several steps along the way of this process. From start to finish, generating and tuning a speech model, for example, can take many days or weeks. The lengthy turnaround time and significant human involvement impose significant cost on the development of new speech recognition systems and prevents the rapid deployment of new systems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein is a method and system for rapidly and automatically generating, tuning, and deploying both acoustic and language speech models used for automatic speech recognition (ASR). Using input data, including input audio recordings and their textual transcriptions as a non-limiting example, this approach can create, tune, and package speech models for immediate deployment by a speech recognition engine. This approach can automatically determine appropriate parameters and continue to completion without additional human interaction after start-up.

The approaches disclosed herein use advanced statistical techniques as well as automation of state of the art speech modeling techniques to produce a kind of ASR conveyor belt that takes as input a minimal set of options and data, in the form of audio samples of speech and their textual transcriptions. The ASR conveyer belt produces as output a complete, validated, and packaged ASR model in a format suitable for immediate deployment in an ASR engine. One significant improvement of this approach is the automation of the entire model generation and tuning process.

Disclosed are systems, methods, and non-transitory computer-readable storage media for generating a model for use with automatic speech recognition. The method includes receiving, as part of a request to generate a model, input data and a seed model. The method further includes receiving a cost function indicating accuracy and at least one of speed and memory usage. The model to optimize the cost function can be an approximate optimization of the cost function, or one that is close enough to provide significant benefit. Then the method includes processing the input data based on the seed model and based on parameters that optimize the cost function to yield an updated model. Processing the input data can include iteratively applying an optimization algorithm, such as a greedy algorithm, to the input data to approximate optimal settings for the updated model. In some embodiments, the input data includes at least one of transcribed speech data, audio data, hex data, web data, and data stored in a database. The seed model can include an acoustic model, a language model, a probabilistic parsing model, a pronunciation model, a text normalization model, and/or a classification model.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for automating and streamlining speech model creation, tuning, and testing with limited human involvement. Whereas in the past, tuning a language model (LM) and tuning an acoustic model (AM) have been done piecemeal by running scripts to tune one or the other, this approach ties it all together end to end. This approach also adds parameters so a user can click "start" or provide some other such input, and the system produces a tuned spoken language model and/or acoustic model as a final result. A system, method and non-transitory computer-readable media are disclosed which generate models in an automated fashion. A brief introductory description is provided first of a basic general purpose system or computing device in FIG. 1 which can be employed to practice the concepts disclosed herein. A more detailed description of block diagrams, automated processes, and methods will then follow. Multiple variations shall be discussed herein as the various embodiments are set forth. The disclosure now turns to FIG. 1.

Figure 1:
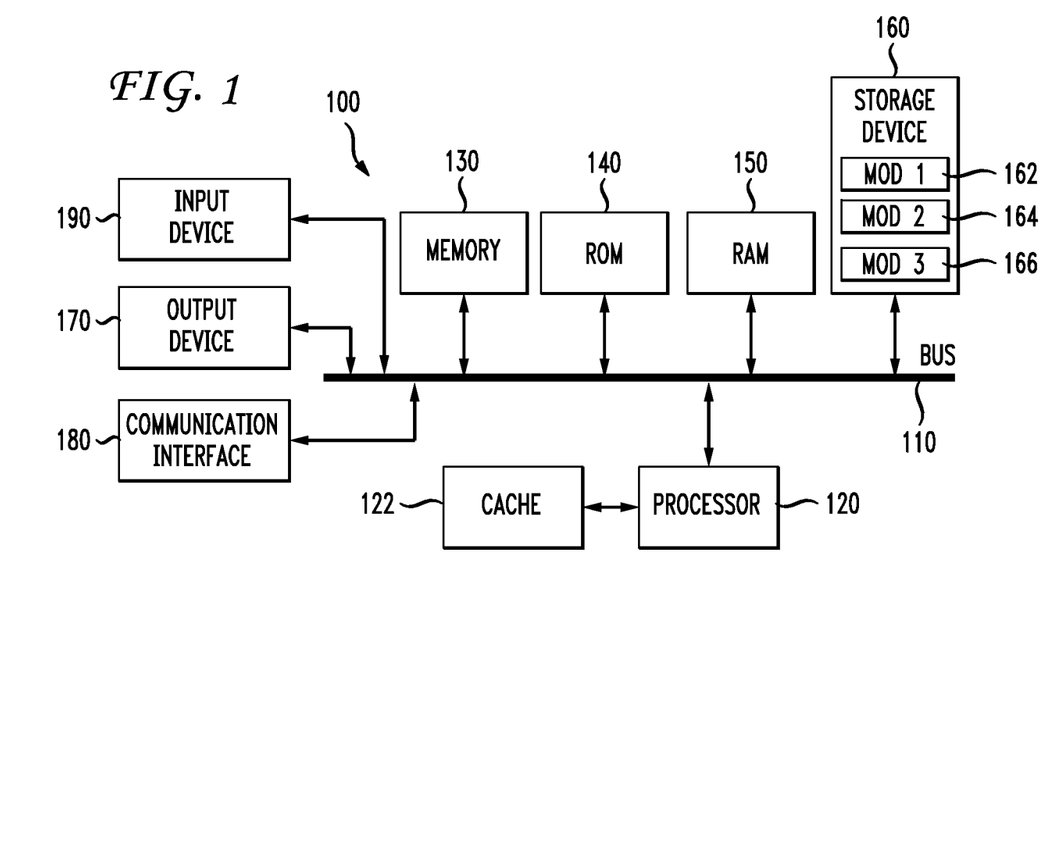
FIG. 1 illustrates an example system embodiment.

With reference to FIG. 1, an exemplary system 100 includes a general-purpose computing device 100, including a processing unit (CPU or other processor) 120 and a system bus 110 that couples various system components including the system memory 130 such as read only memory (ROM) 140 and random access memory (RAM) 150 to the processor 120. ROM 140 may be any one or more of ROM, PROM, EPROM, EEPROM, or other types of read only memory. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks or other types of optical disks, solid state drives, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided. Elements of system 100 may be co-located or may be distributed, such as across a network across one or more sites.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which can be modules configured to control the processor 120. These modules may be stored on the storage device 160 and loaded into RAM 150 or memory 130 at runtime or may be stored as would be known in the art in other computer-readable memory locations.

Having disclosed some components of a basic computing device, the disclosure returns to a discussion of the streamlined, automated approach to generating, tuning, and/or deploying acoustic, language, and/or speech models for use with ASR. The system computes a language model (LM) to assign the probability of a sequence of words based on a set of training data. The system trains an acoustic model (AM) by speech audio signals to provide statistical representations of the sounds that make up each word. The system can train/ retrain an acoustic model, as shown in the example block diagram 200 in FIG. 2. In this approach, one or more users and/or an automated process selects and submits a bootstrap acoustic model 202, features extracted from training audio 204 via a feature extraction module 206, and transcription text 208 of the training audio 204. The transcription text 208 can be automatically generated and/or human transcribed. The dashed box 210 represents the functions which this approach streamlines and automates. A segmentation module 212 segments speech data and provides segmented speech data to a context-dependent phoneme tree 218 that performs Hidden Markov Model (HMM) state tying. Based on these and/or other tied mixtures, block 216 estimates AM mixture parameters to create an AM 214. The system then generates a new AM 214 based on the AM mixture parameter estimation 216 and feeds the new AM 214 back to the segmentation module 212 for another iteration.

Figure 2:
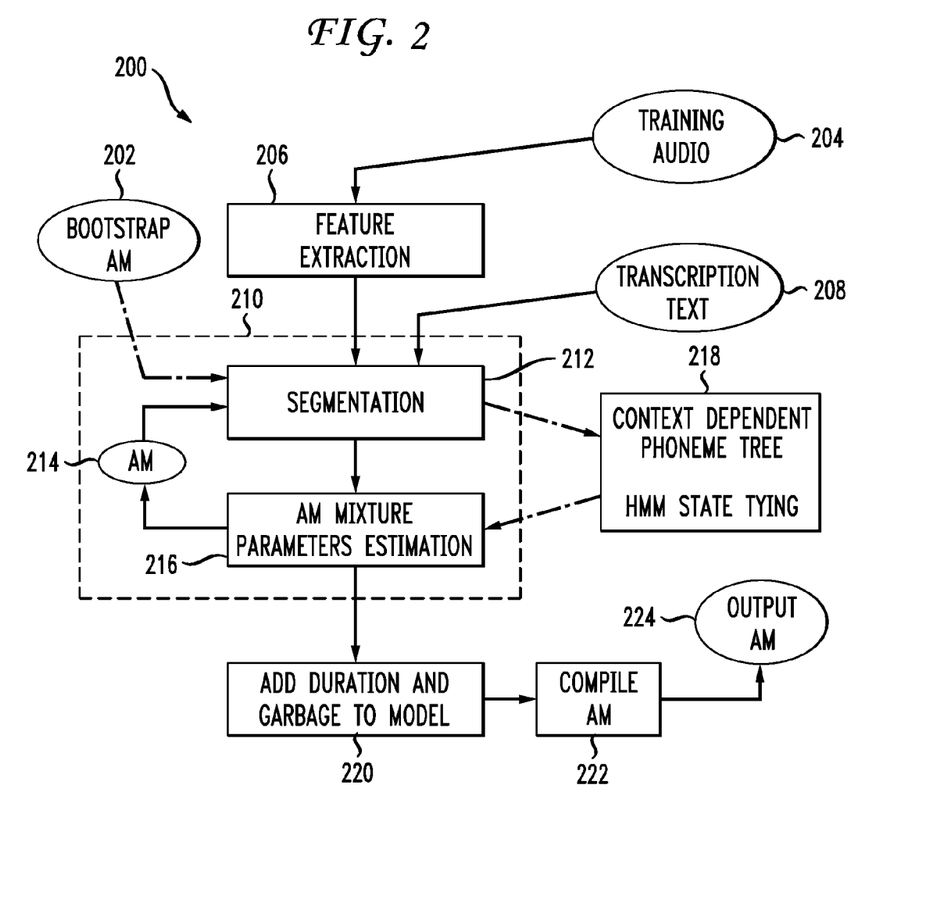
FIG. 2 illustrates an example block diagram of acoustic model retraining.

The system can use an optimization algorithm, such as a greedy algorithm or other suitable optimization algorithm, to practically approximate the best settings or parameters required for a particular application via a series of, for example, 20-30 iterations representing 20-30 hours of automatic work rather than days or months of manual work and intervention. Generally speaking, a greedy algorithm makes a locally optimal choice at each iteration, and may not always result in a globally optimal choice. The principles described herein can be implemented using one or more of various greedy algorithms, such as a pure greedy algorithm, orthogonal greedy algorithm, or a relaxed greedy algorithm. These iterations automatically estimate parameters of the system. Some exemplary parameters include beam width, grammar scale, word insertion penalty, maximum arc length, maximum number of arcs allowed at any point in time, state duration, and others. In one aspect, the system performs portions of these steps in parallel, such as via multiple physical and/or virtual processor cores.

In one aspect, the system tunes parameters via, for example, the Powell optimization algorithm. Other exemplary algorithms include the Davidson-Fletcher-Powell formula, the Nelder-Mead method, and gradient descent. The system can tune parameters to optimize for a cost function that represents a combination of speed, accuracy, and memory, as shown in the algorithm below:

$$Accscore(ASR(X_i))=f(X_i) \rightarrow \text{word accuracy and speed}$$

where the following definitions apply:

$$f_{min}(X_i)=-1*(\text{word accuracy}-\beta*\text{speed})$$

$$\text{speed}=(\text{CPU time})/(\text{audio time})$$

$\beta$=a weighting factor to speed that provides a tradeoff between accuracy and speed $X_i$=a set of parameters that affect accuracy and speed, such as beam width, LM scale, MAP multiplier, maximum active arcs, duration scale, and so forth.

After a certain number of iterations or after the mixture parameters satisfy a threshold, the system can add duration and garbage to the resulting AM 220 and compile the AM 222 to produce an output AM 224 that is ready for immediate implementation in a natural language system. The output AM 224 can be used as a bootstrap acoustic model to generate a new output acoustic model.

In addition to the first pass training described above, the system can perform two other normalization methods or passes. The second pass is a vocal tract length normalization (VTLN) pass. This method reduces the inter-speaker variability by normalizing the spectrum of speaker speech with a warping factor, then training the AM with the normalized feature. The third pass is a constrained model adaptation (CMA). In this pass, instead of warping spectrum for speakers, the system performs feature maximum likelihood linear regression (FMLLR) to map the feature vectors of individual speakers to a target Hidden Markov Model (HMM). Then the system trains a new AM with the transformed feature.

Figure 3:
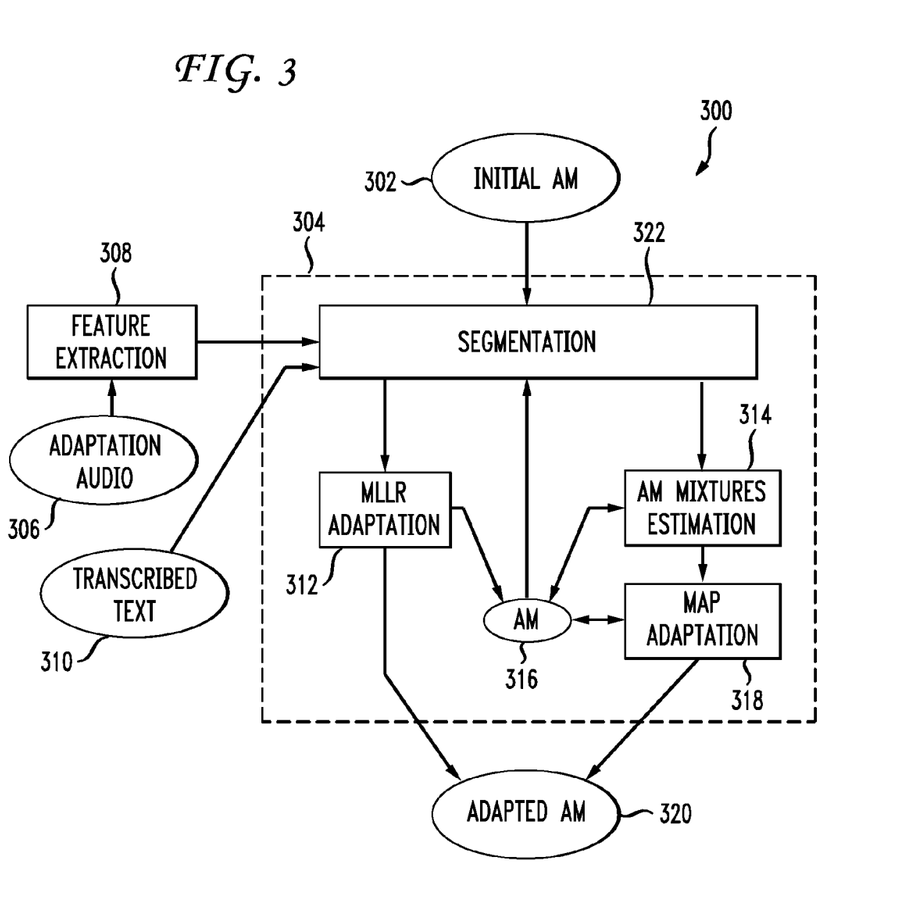
FIG. 3 illustrates an example block diagram of acoustic model adaptation.

FIG. 3 illustrates an example block diagram 300 of acoustic model (AM) adaptation. In this approach, the system receives an initial AM 302, features extracted from adaptation audio 306 via a feature extraction module 308, and transcribed text 310 of the adaptation audio 306. As in FIG. 2, the dashed box 304 represents functions which this approach streamlines and automates. In one variation, the segmentation module 322 groups segments of speech, for example so that the segments of speech correspond to specific parts of the acoustic model. This segmentation is passed to maximum likelihood linear regression (MLLR) adaptation module 312, which adapts model parameters using the MLLR algorithm and places the result in AM 316. Segmentation is also passed to AM mixtures estimation 314 where mixtures (part of an acoustic model) are computed. From the AM mixture 314, the system generates a map adaptation 318. Based on the MLLR adaptation 312, the AM mixture 314, and map adaptation 318, the system generates an acoustic model 316. The system feeds the acoustic model 316 back into the segmentation module for another iteration. After a certain number of iterations, after the mixture parameters satisfy a threshold, or based on some other factor, the system produces an adapted AM 320, based on the MLLR adaptation 312 and the map adaptation 318, that is ready for immediate implementation in a natural language system. The adapted AM 320 can be used as an initial AM to generate a new adapted AM.

Figure 4:
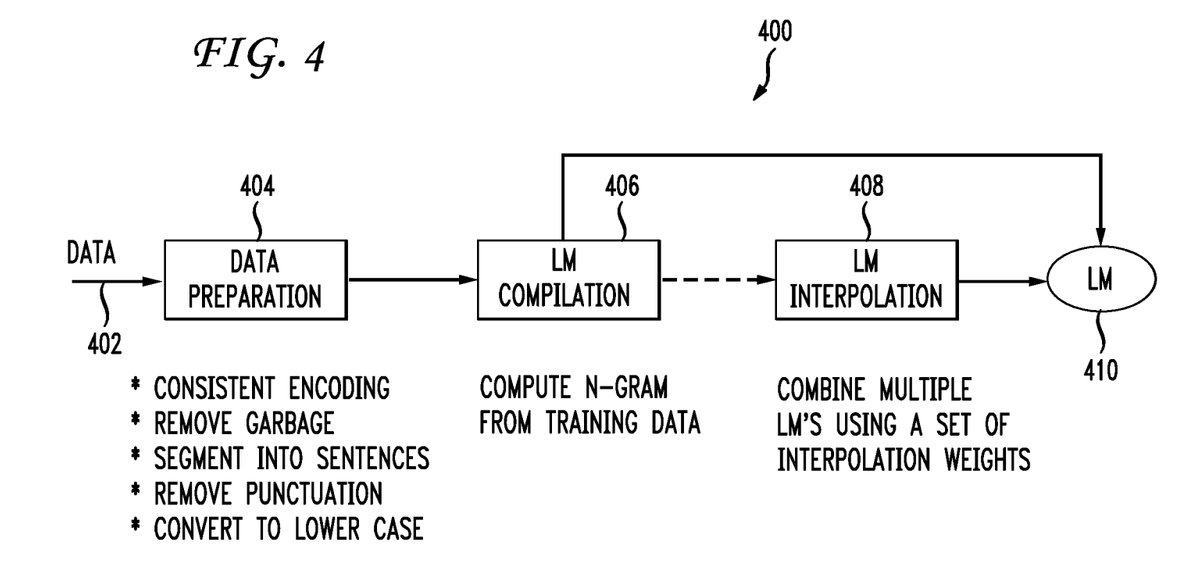
FIG. 4 illustrates an example language model training flow diagram.

FIG. 4 illustrates an example language model (LM) training flow diagram 400. In this process, the system receives data 402, such as training data, transcribed speech data, audio data, hex data, web data, and data stored in a database. A data preparation module 404 performs tasks such as harmonizing data encoding so that the data is consistently encoded according to a minimum standard, removing garbage and/or useless information from the data 402, segmenting audio and/or text data into sentences, removing punctuation from text data, and converting text data to lower case. The LM compilation module 406 receives the prepared data and compiles an LM 410 by computing one or more N-gram from the prepared data. Further, an LM interpolation module 408 can combine the LM output from the LM compilation module 406 with other LMs using a set of interpolation weights to generate the LM 410.

Figure 5:
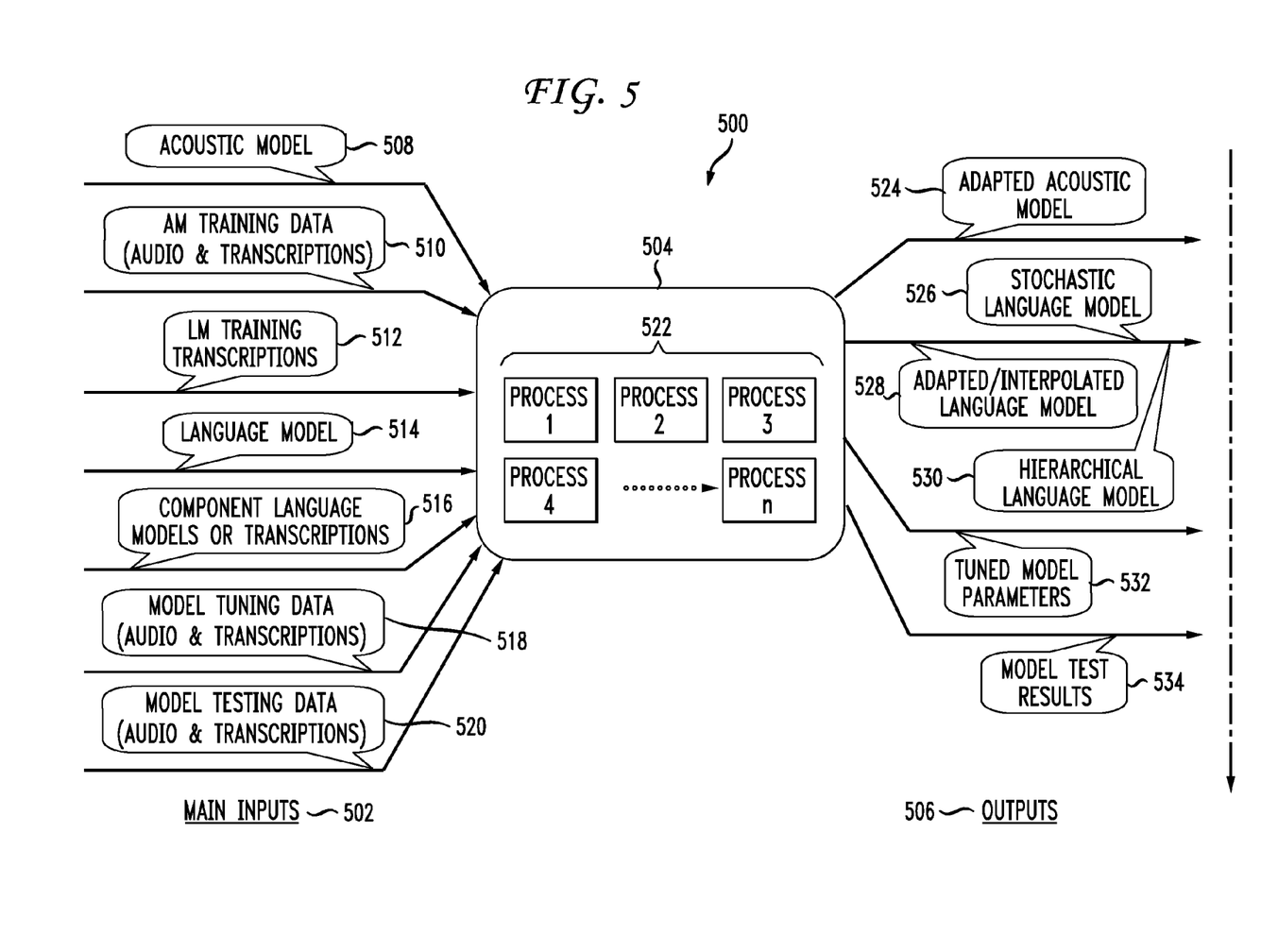
FIG. 5 illustrates an example tool for adapting a language model and/or an acoustic model.

The approaches set forth herein can automate acoustic model retraining, acoustic model adaptation, language model training, and/or model tuning and testing. FIG. 5 illustrates one example implementation of a tool that automates acoustic model retraining FIG. 6 illustrates one example implementation of a tool that automates acoustic model adaptation, language model training, and model tuning and testing.

FIG. 5 illustrates an example flow 500 for using a tool 504 to adapt a language model and/or an acoustic model. The tool 504 receives a set of one or more inputs 502 and produces one or more outputs 506. Some exemplary inputs include an acoustic model (AM) 508, AM training data including, for example, audio and transcriptions 510, language model training transcriptions 512, one or more language model(s) 514, component language models or transcriptions 516, model tuning data 518, and model testing data 520. The tool 504 can process these inputs in serial or in parallel. For example, the tool 504 shows multiple sub processes 522, each of which can execute as a separate process, thread, or fiber on a single core processor, multi-core processor, or group of processors. The tool can produce as output one or more of an adapted AM 524, a stochastic language model 526, an adapted/interpolated LM 528, a hierarchical LM 530, tuned model parameters 532, model test results 534, updated models, settings of parameters, evaluation metrics of how would these models perform, language model engine settings affecting performance, and so forth.

Figure 6:
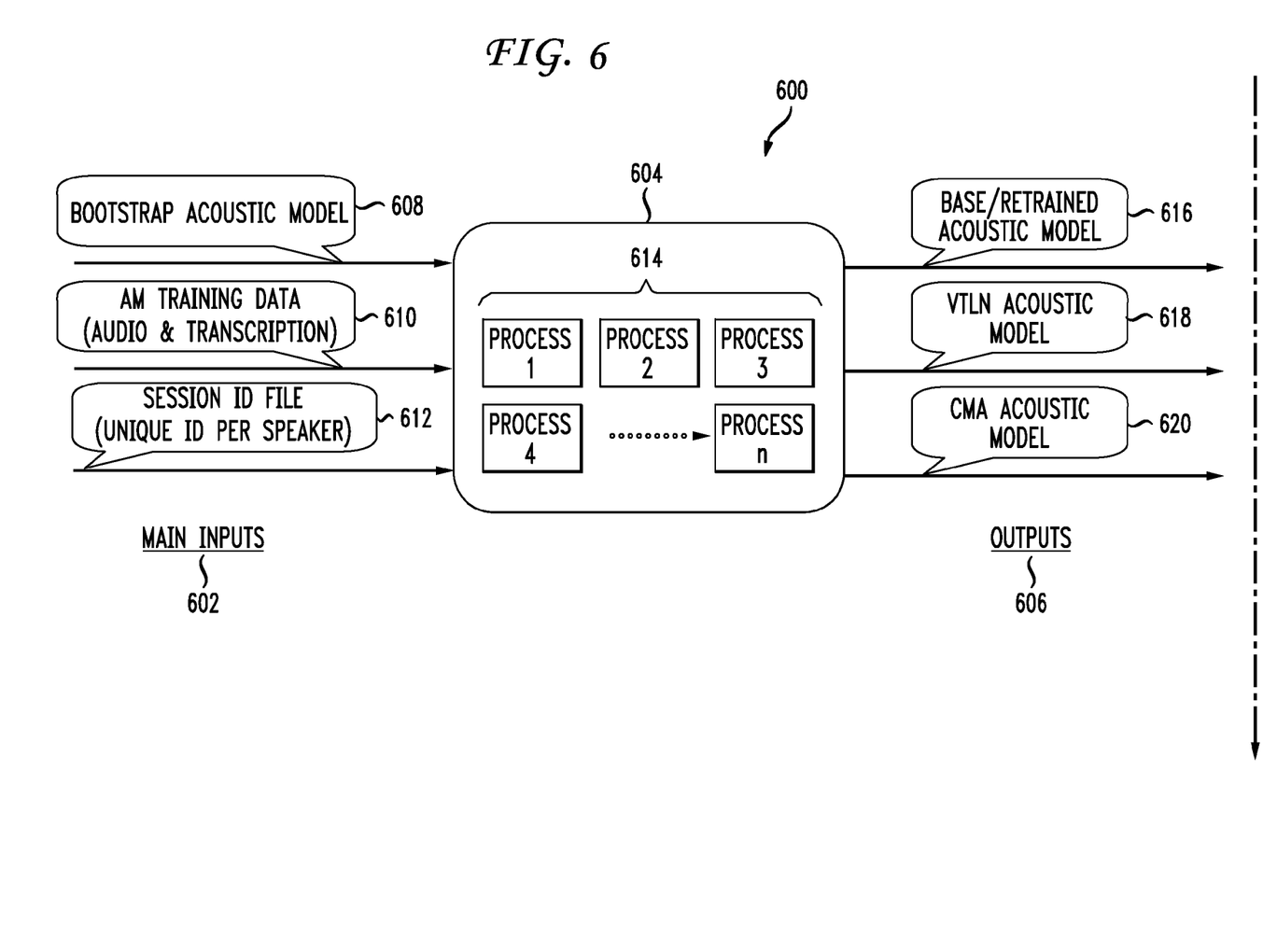
FIG. 6 illustrates an example multi-pass tool for training a language model and/or an acoustic model.

FIG. 6 illustrates an example flow 600 for using a multi-pass tool 604 for training a language model and/or an acoustic model. The tool 604 receives a set of one or more inputs 602, operates on the inputs, and produces one or more outputs 606. The tool 604 can include one or more processes 614 that can operate in serial or in parallel. Some example inputs include a bootstrap AM 608, AM training data 610, and a session ID file 612 that can include a unique identifier per speaker. The tool 604 processes these inputs and generates outputs such as a base or retrained AM 616, a VTLN acoustic model 618, and a constrained model-space adaptation (CMA) acoustic model 620.

These tools can be implemented using any suitable programming language(s) and can form standalone command line utilities or GUI utilities, or can be integrated into the functionality of a larger program.

Figure 7:
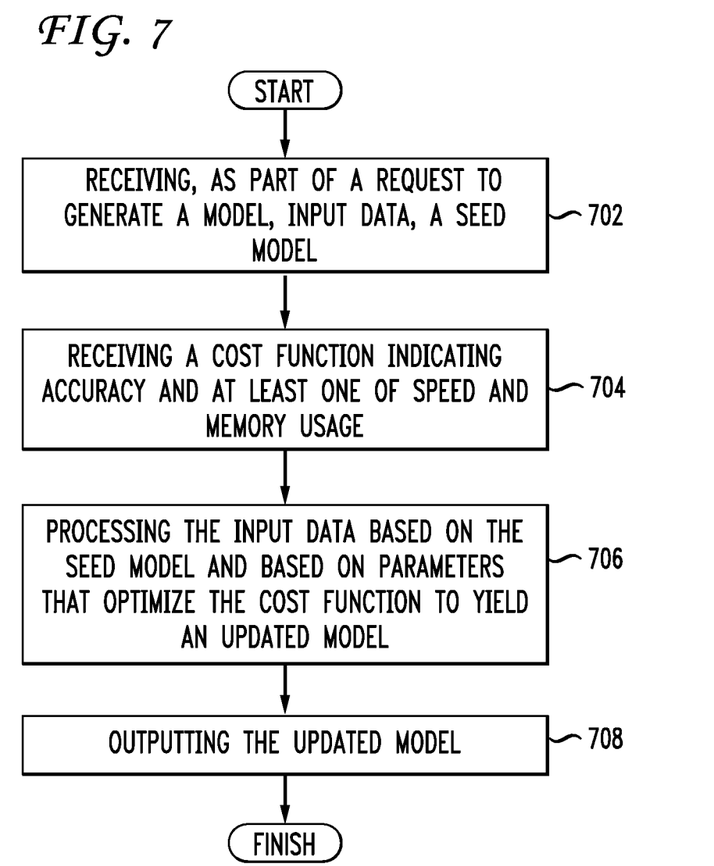
FIG. 7 illustrates an example method embodiment.

Having disclosed some basic system components, the disclosure now turns to the exemplary method embodiment for generating a model for use with automatic speech recognition as shown in FIG. 7. For the sake of clarity, the method is discussed in terms of an exemplary system 100 as shown in FIG. 1 configured to practice the method. The various steps of the method can be implemented in any combination with each other and/or with other steps. The system 100 receives, as part of a request to generate a model, input data and an optional seed model (702). In some variations, the system operates without a seed model to create an AM from scratch. The input data can include transcribed speech data, untranscribed speech data, audio data, hex data, web data, and/or data stored in a database. The seed model can be, for example, an acoustic model, a language model, a probabilistic parsing model, a pronunciation model, a text normalization model, and/or a classification model. The seed model can be a model previously generated using this approach.

The system 100 receives a cost function indicating accuracy and at least one of speed and memory usage (704). A user can use a set of sliders to indicate a percentage focus on each of these three areas. For example, the user sets the accuracy slider to 45%, the speed slider to 25% and the memory usage slider to 30%. The system then focuses on these three areas in those proportions. In another example, the user indicates 95% focus on speed and 5% focus on accuracy, with 0% (or no) focus on memory usage. Accuracy, speed, and memory usage are three exemplary considerations. The cost function can incorporate other considerations as well. The optimized parameters can represent an approximate optimization of the cost function, such that the optimization algorithms are executed quickly and find parameters that are close enough to optimal to be useful. Parameters can include, for example, beam width, grammar scale, word insertion penalty, maximum arc length, maximum number of arcs allowed at any point in time, state duration, and any other useful parameters for speech recognition and/or natural language understanding.

The system 100 processes the input data based on the optimized parameters and the seed model to yield an updated model (706) and outputs the updated model (708) that, in one embodiment, is ready for implementation in an automatic speech recognizer. Processing the input data can further include building the updated model, tuning the updated model, or certifying the updated model. The system can process the input data by iteratively applying a greedy algorithm, or other optimization algorithm, to the input data to approximate optimal settings for the updated model. This approach can be implemented as part of a three pass process including a first pass for retraining, a second pass for vocal-tract length normalization, and a third pass for constrained model adaptation. These principles can be applied to generate language models such as probabilistic parsing models, pronunciation models, text normalization models, and classification models. This approach streamlines the entire process of providing speech professional service, including steps such as acquiring data, building an acoustic model, building a language model, and setting system parameters to build language models. This approach is not a proper speech recognizer, but can operate in conjunction with a speech recognizer.

The solutions presented herein can provide several benefits. For example, this approach results in significantly faster turnaround than traditional approaches. This approach can reduce both human effort and processing time from days to hours. Further, the automation includes advanced statistical techniques that improve accuracy and remove the need for subject-matter-expert input during several phases of the overall process. Thus, the number and speed of ASR deployments can increase significantly without a correspondingly significant cost increase. These principles can be implemented as part of speech professional services support for telecommunications infrastructure applications, consumer applications, or mobile device applications.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied in acoustic model retraining, acoustic model adaptation, language model training, and model tuning and testing. The principles herein can also be applied to models for punctuation, capitalization, feature extraction, and natural language understanding and to all aspects of natural language processing, such as speech generation as well as speech recognition. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, from a first entity, a request to generate a model, wherein the request comprises input data and a seed model;
receiving a cost function associated with generation of the model, the cost function indicating an accuracy and one of speed and memory usage, wherein the cost function is formulated as:

$$\text{Accscore}(ASR(Xi))=f(Xi) \rightarrow \text{word accuracy and speed}$$

where the following definitions apply:

$$f\min(Xi)=-1*(\text{word accuracy}-\beta*\text{speed}),$$

$$\text{speed}=(\text{CPU time})/(\text{audio time}),$$

$\beta$=a weighting factor to speed that provides a tradeoff between accuracy and speed,
$Xi$=a set of parameters that affect accuracy and speed, such as beam width, LM scale, MAP multiplier, maximum active arcs, duration scale;
processing, at a second entity, the input data based on the seed model and based on parameters that modify one of the accuracy and the one of the speed and the memory usage of the cost function, to yield an updated model; and
outputting the updated model.

2. The method of claim 1, wherein the input data comprises one of transcribed speech data, audio data, hex data, web data, and data stored in a database.

3. The method of claim 1, wherein the seed model comprises one of an acoustic model, a language model, a probabilistic parsing model, a pronunciation model, a text normalization model, and a classification model.

4. The method of claim 1, wherein processing the input data further comprises one of building the updated model, tuning the updated model, and certifying the updated model.

5. The method of claim 1, wherein the parameters result in the cost function yielding a known output.

6. The method of claim 1, wherein the updated model is ready for implementation in an automatic speech recognizer.

7. The method of claim 1, wherein processing the input data further comprises iteratively applying an algorithm to the input data to determine settings for the updated model.

8. The method of claim 1, wherein the parameters comprise one of beam width, grammar scale, word insertion penalty, maximum arc length, maximum number of arcs allowed at any point in time, and state duration.

9. The method of claim 1, wherein processing the input data comprises a first pass for retraining, a second pass for vocal-tract length normalization, and a third pass for constrained model adaptation.

10. A system comprising:
a processor; and
a computer-readable storage medium having instructions stored which, when executed by the processor, result in the processor performing operations comprising:
receiving, from a separate entity, a request to generate a model, input data and a seed model;
receiving a cost function associated with generation of the model, the cost function indicating an accuracy and one of speed and memory usage, wherein the cost function is formulated as:

$$\text{Accscore}(ASR(Xi))=f(Xi) \rightarrow \text{word accuracy and speed}$$

where the following definitions apply:

$$f\min(Xi)=-1*(\text{word accuracy}-\beta*\text{speed}),$$

$$\text{speed}=(\text{CPU time})/(\text{audio time}),$$

$\beta$=a weighting factor to speed that provides a tradeoff between accuracy and speed
$Xi$=a set of parameters that affect accuracy and speed, such as beam width, LM scale, MAP multiplier, maximum active arcs, duration scale;
processing the input data based on the seed model and based on parameters that modify one of the accuracy and the one of speed and memory of the cost function, to yield an updated model; and
outputting the updated model.

11. The system of claim 10, wherein the input data comprises one of transcribed speech data, untranscribed speech data, audio data, hex data, web data, and data stored in a database.

12. The system of claim 10, wherein the seed model comprises one of an acoustic model, a language model, a probabilistic parsing model, a pronunciation model, a text normalization model, and a classification model.

13. The system of claim 10, wherein processing the input data further comprises building the updated model, tuning the updated model, and certifying the updated model.

14. The system of claim 10, wherein the parameters result in the cost function yielding a known output.

15. The system of claim 10, wherein the updated model is ready for implementation in an automatic speech recognizer.

16. A computer-readable storage device having instructions stored which, when executed by a computing device, cause the computing device to perform operations comprising:

receiving, from a separate entity, of a request to generate a model, input data and a seed model;
receiving a cost function associated with generation of the model, the cost function indicating accuracy and one of speed and memory usage, wherein the cost function is formulated as:

$$\text{Accscore}(ASR(Xi))=f(Xi) \rightarrow \text{word accuracy and speed}$$

where the following definitions apply:

$$f\min(Xi)=-1* (\text{word accuracy}-\beta*\text{speed}),$$

$$\text{speed}=(\text{CPU time})/(\text{audio time}),$$

$\beta$=a weighting factor to speed that provides a tradeoff between accuracy and speed,
Xi=a set of parameters that affect accuracy and speed, such as beam width, LM scale, MAP multiplier, maximum active arcs, duration scale;
processing the input data based on the seed model and based on parameters that modify the accuracy and the one of speed and memory usage of the cost function, to yield an updated model; and
outputting the updated model.

17. The computer-readable storage device of claim 16, wherein the updated model is ready for implementation in an automatic speech recognizer.

18. The computer-readable storage device of claim 16, wherein processing the input data further comprises iteratively applying an algorithm to the input data to determine settings for the updated model.

19. The computer-readable storage device of claim 16, wherein the parameters comprise one of beam width, grammar scale, word insertion penalty, maximum arc length, maximum number of arcs allowed at any point in time, and state duration.

20. The computer-readable storage device of claim 16, wherein processing the input data comprises a first pass for retraining, a second pass for vocal-tract length normalization, and a third pass for constrained model adaptation.

* * * * *